W. C. BUCKNAM.
TORCH ADJUSTER ARM.
APPLICATION FILED JULY 1, 1920.
1,390,600.
Patented Sept. 13, 1921.
5 SHEETS—SHEET 1.
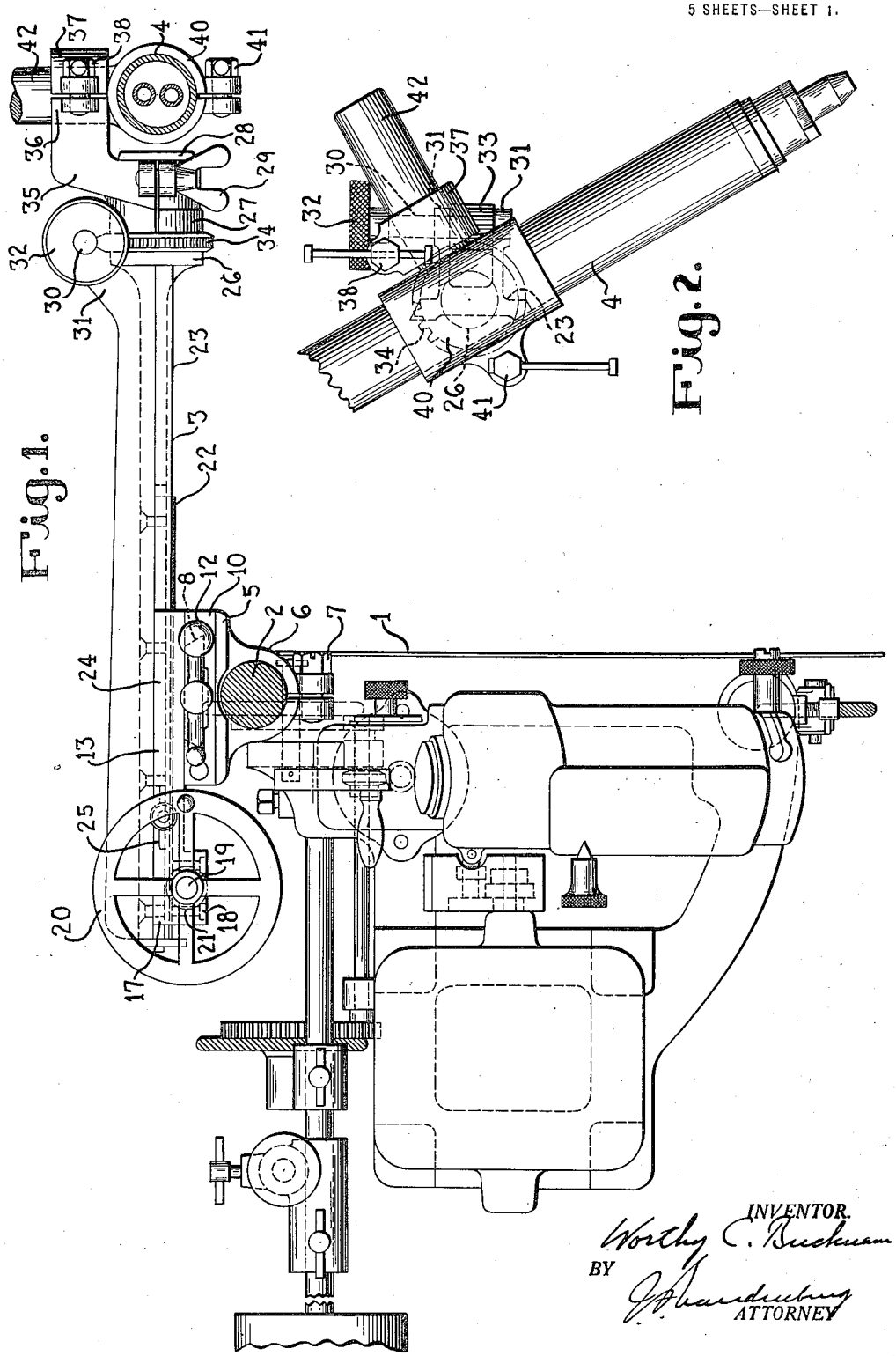
INVENTOR.
Worthy C. Bucknam
BY
ATTORNEY

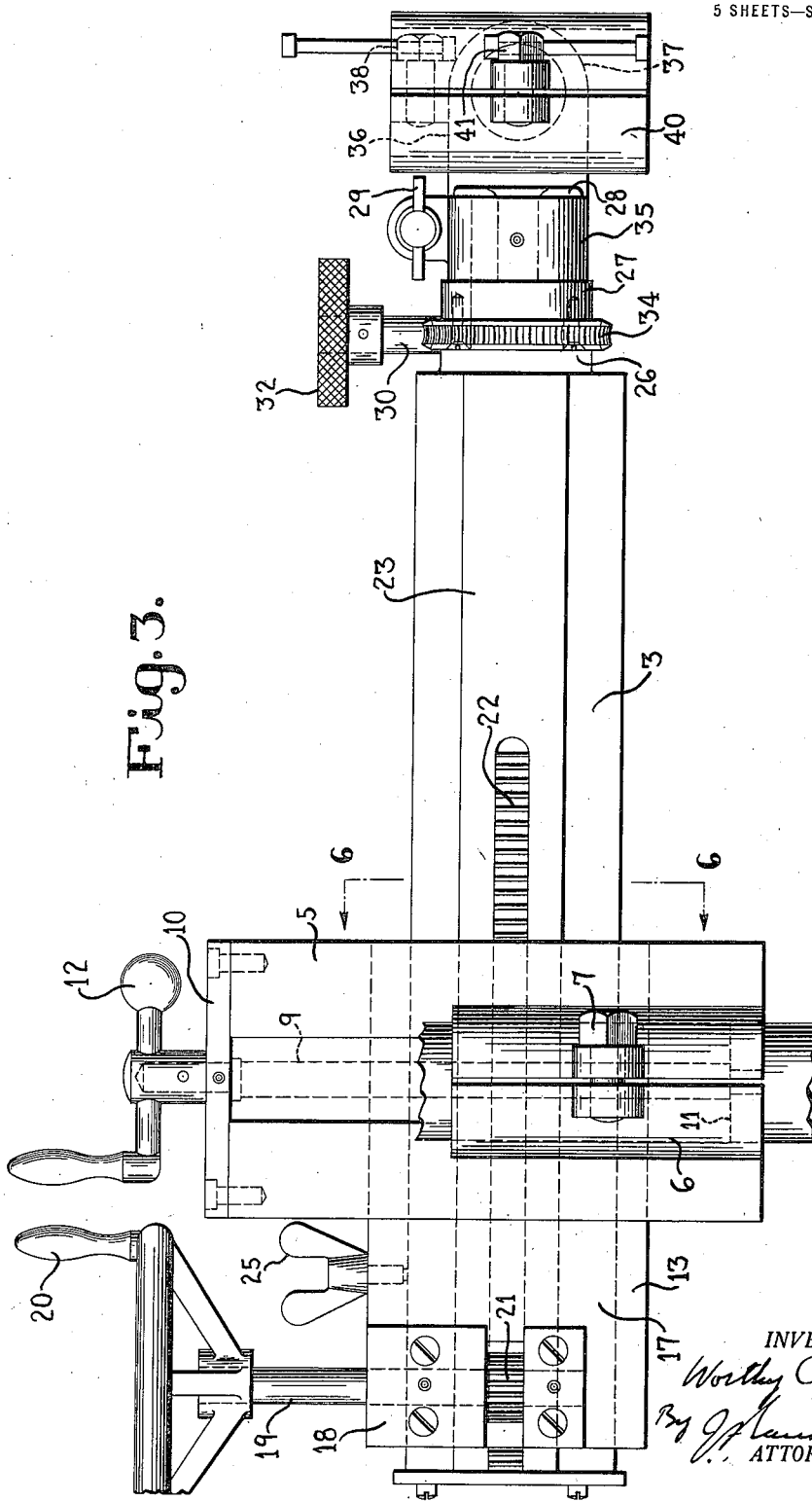

W. C. BUCKNAM.
TORCH ADJUSTER ARM.
APPLICATION FILED JULY 1, 1920.
1,390,600.
Patented Sept. 13, 1921.
5 SHEETS—SHEET 3.
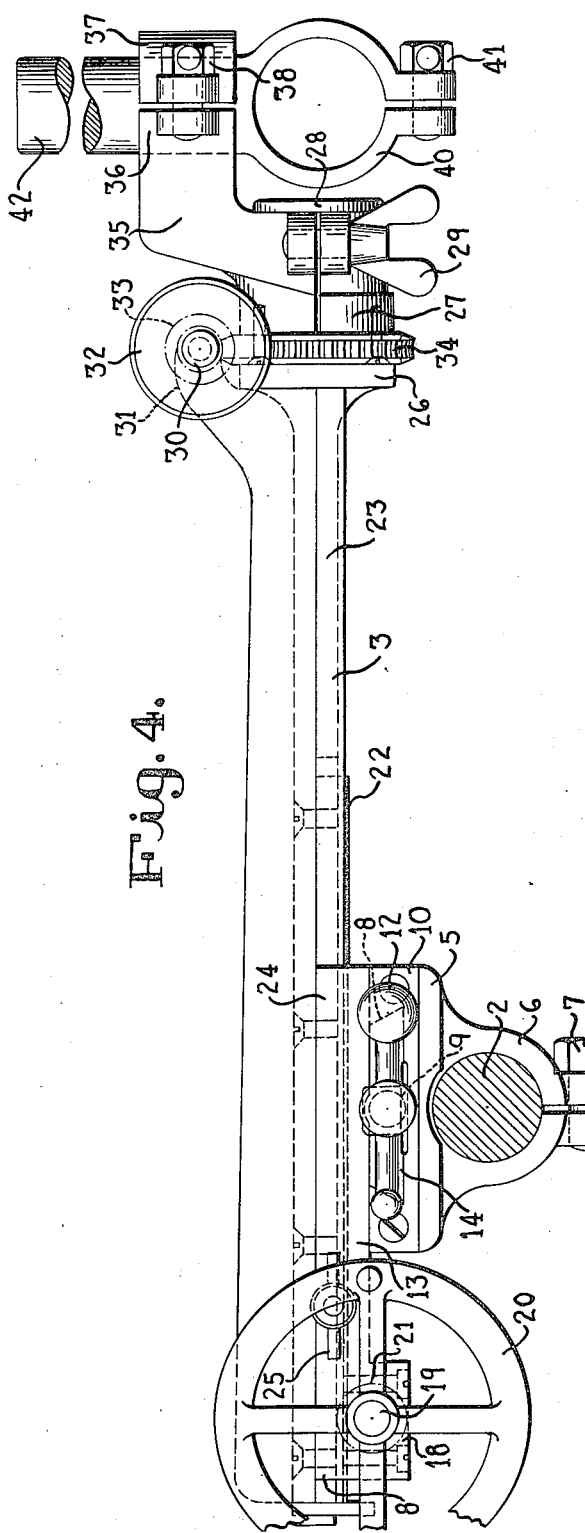
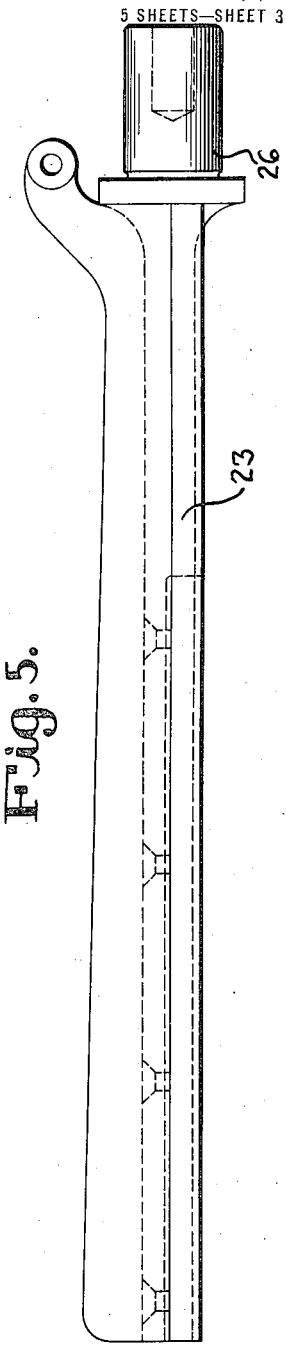
INVENTOR.
Worthy C. Bucknam
BY
ATTORNEY W. C. BUCKNAM.
TORCH ADJUSTER ARM.
APPLICATION FILED JULY 1, 1920.
1,390,600.
Patented Sept. 13, 1921.
5 SHEETS—SHEET 4.
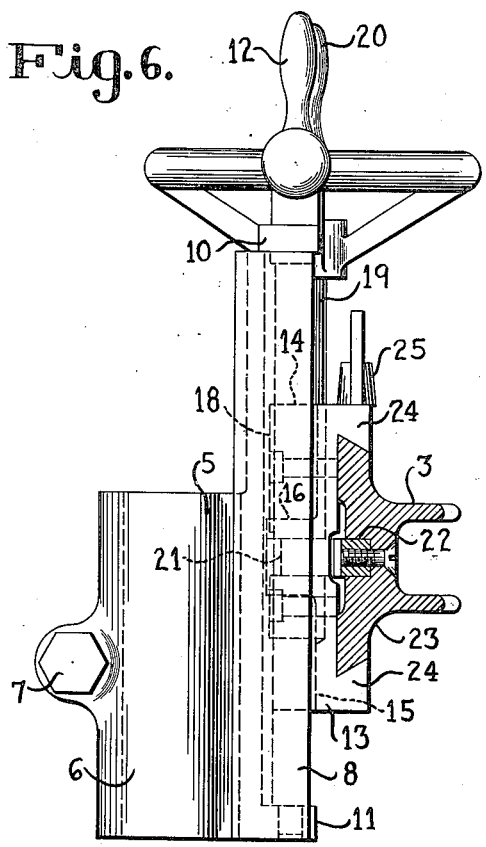
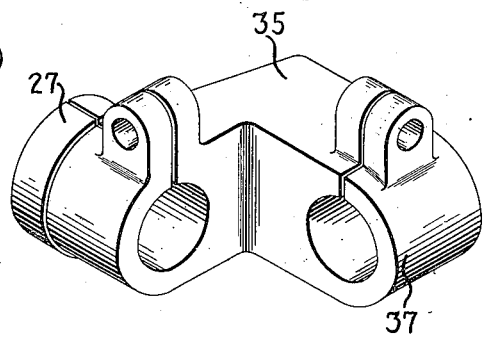
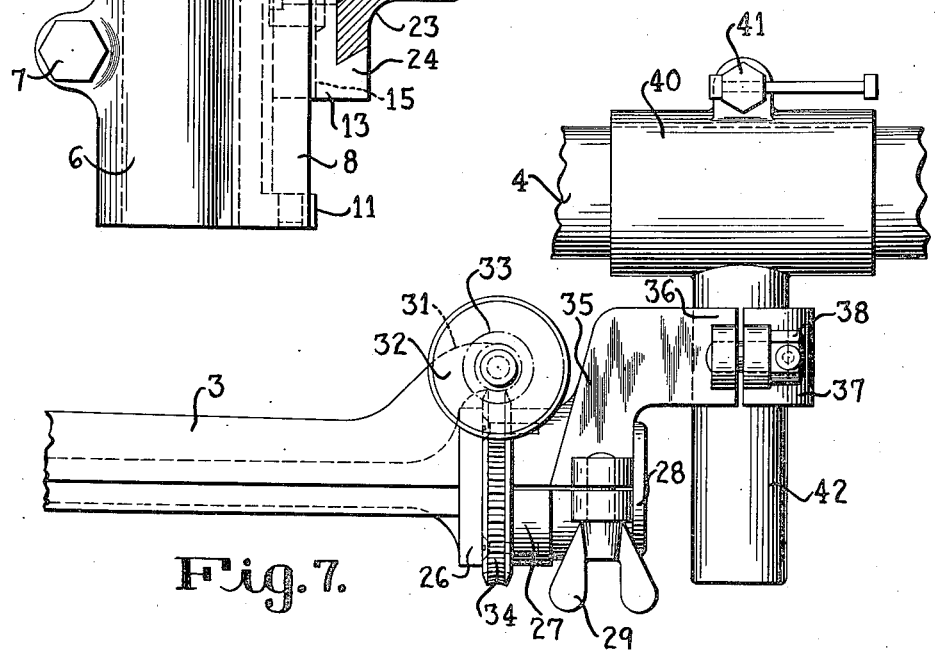
INVENTOR.
Worthy C. Bucknam
BY
ATTORNEY

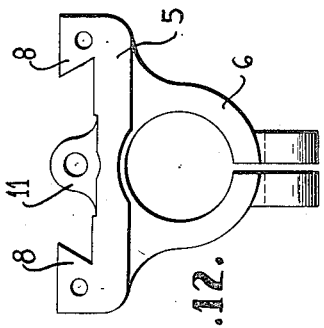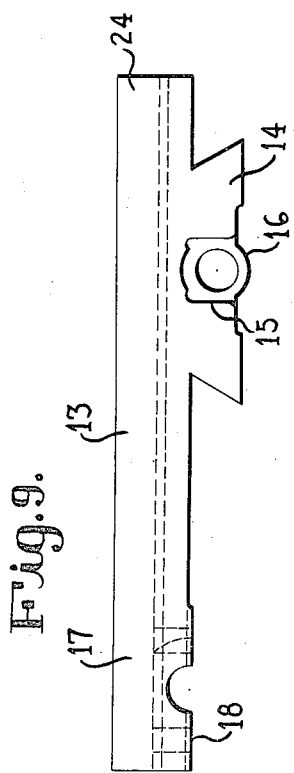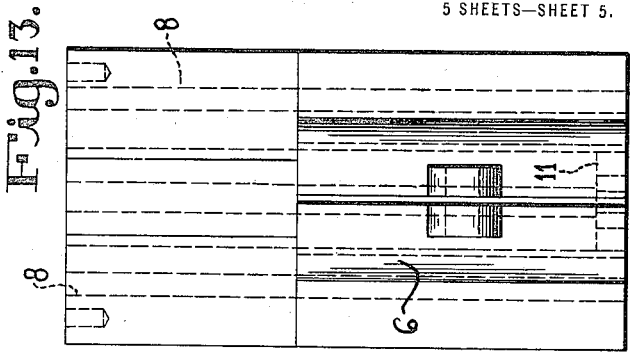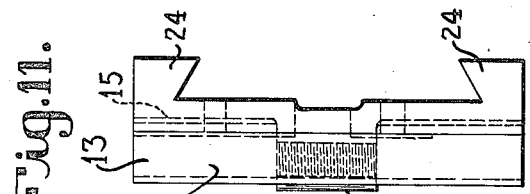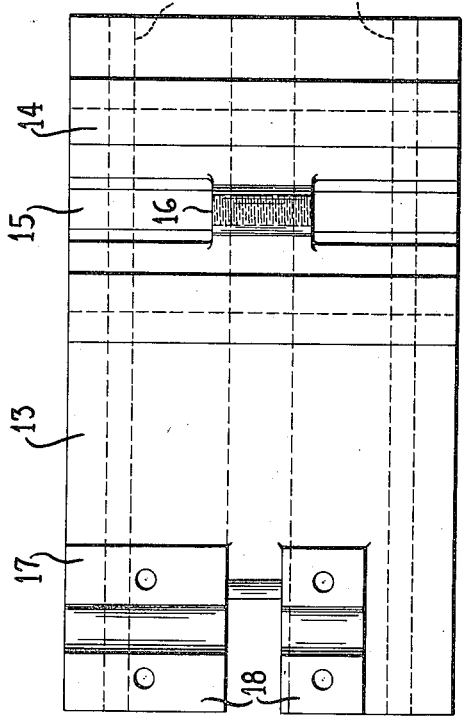

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

TORCH-ADJUSTER ARM.

1,390,600.   Specification of Letters Patent.   Patented Sept. 13, 1921.

Application filed July 1, 1920. Serial No. 393,358.

*To all whom it may concern:*

Be it known that I, WORTHY C. BUCKNAM, a citizen of the United States, and a resident of Jersey City, in the county of Hudson and State of New Jersey, have invented a new and useful Torch-Adjuster Arm, of which the following is a specification.

The object of the invention is to provide an improved torch-adjuster arm possessing special utility and variety of torch-adjustment, affording the machine increased capacity for cutting or welding, and characterized also by the facility of effecting the adjustments, and by the strength of its construction and the firmness with which the torch is supported in any of its positions. The arm is designed more particularly for portable, self-propelled cutting and welding machines of the type disclosed in my Patents Nos. 1,118,183 of November 24, 1914 and 1,318,725 of October 14, 1919, and may be regarded as an improvement upon and within the matters therein claimed. The invention may be said to consist in the parts, improvements and combinations hereinafter described in preferred embodiment, and more particularly pointed out in the appended claims.

In the accompanying drawings:

Figure 1 is a plan view of the device upon a traveling cutting machine of the character indicated, the torch being represented in section;

Fig. 2 is a side view looking at the outer end of the adjuster arm adjusted so as to incline the torch forwardly;

Fig. 3 is a rear elevation of the arm mounted upon a fragment of the supporting post;

Fig. 4 is a plan view of the arm;

Fig. 5 is a plan view of the horizontal slide portion thereof;

Fig. 6 is a vertical transverse section on the line 6—6 of Fig. 3;

Fig. 7 is a plan view of the outer part of the arm, showing an adjustment for cutting with the torch directed outward or horizontally;

Fig. 8 is a perspective view of the torch-holder bracket;

Fig. 9 is a plan view of the vertical slide;

Fig. 10 is a rear elevation thereof;

Fig. 11 is an end view of the vertical slide;

Fig. 12 is a plan view of the post-bracket; and

Fig. 13 is a rear elevation of the post-bracket.

The self-propelled wheeled car by which the torch is transported at uniform, adjustable speed over or relatively to the work is designated generally by the numeral 1. A post 2 rises from a forward corner region of this car to receive the torch-arm, which is designated generally 3. An oxyacetylene or like cutting or welding torch 4 is carried by the arm at the side of the car or in front and in various angular positions according to the nature of the work to be done.

The primary element of the arm is a post-bracket 5 having a split sleeve 6 at the back, with a clamping screw 7, to fit the post. Rough vertical adjustment can be secured by moving the post-bracket up and down on the post, and it is intended to be swung on the post to dispose the arm laterally outward, or forwardly, or inward across the front of the machine. The front face of the post-bracket has undercut side ribs 8 forming a vertical guide. A vertical adjusting screw shaft 9 is held rotatably but against longitudinal movement in a top ledge 10 on the bracket, and journaled at its lower end in a step 11 thereon. On the upper end of said screw shaft is an operating handle 12.

A plate 13 constituting a vertical slide is applied to the front face of the post-bracket, having a vertical dovetail projection 14 which fits slidably in the recess formed by the ribs 8. Said dovetail is recessed vertically as indicated at 15 to accommodate the screw 9 and intermediate its top and bottom has a nut portion 16 to engage the threads of the screw.

The vertical slide has an extension 17 projecting horizontally inward from the post region and provided with bearings 18 for a vertical rotary shaft 19, having a handle 20 at its upper end, adjacent the handle 12. The shaft 19 bears a pinion 21, which meshes with a horizontal rack 22, secured longitudinally to the back of a horizontal elongated slide or arm member 23, which is movable on the vertical slide. As illustrated, the arm member is of dovetail formation, fitting between horizontal undercut guide ribs 24 on the front of the vertical slide. A set-screw 25 may be provided to lock the arm member to the vertical slide at its various adjusted positions therein.

The outer end of the horizontal slide or arm member is in the form of a cylindrical bearing 26, and on this is mounted a split swivel sleeve 27, held in place by a screw 28, and provided with a clamping screw 29, whereby it can be locked at any angular adjustment about the longitudinal axis. The swivel is operated by means of a vertical shaft 30 journaled in forwardly projecting bearings 31 on the arm member and having a handle 32 at the top and a worm 33 intermediate its ends, meshing with a worm-wheel 34 fixed to the swivel.

The swivel sleeve forms part of an angular torch-holder bracket 35, the outer limb 36 of which projects endwise from the arm and in laterally offset relation thereto. Such offset extension will generally be disposed at the front, and comprises a split collar 37 with clamping screw 38, the opening of this collar being transverse to the length of the arm and to the axis of the swivel.

The torch-holder 39 consists of a split collar 40 with clamping screw 41, to receive the torch, and a cylindrical stem 42 transverse to the axis of said collar and held in the collar 37 of the torch-holder bracket. Ordinarily said stem will project forward and the torch collar 40 will be disposed within the angle of the torch-holder bracket 35.

In use, the torch is adjusted up and down by means of the vertical slide 13 on the post-bracket, and the screw 9 and handle 12. Horizontal adjustment is produced by moving the horizontal slide or arm member in and out relatively to the post-bracket by the shaft 19 operating the pinion meshing with the longitudinal rack. The handle 20 of this shaft and the handle 12 are rotatable at the top about adjacent parallel axes, which makes for convenience of operation. The torch may be supported vertically or tilted at any angle forwardly or rearwardly according to the adjustment of the swivel 27. By means of the second swivel adjustment, at right angles to the first, secured by turning the stem 42 in the collar 37, the torch can be tilted laterally with reference to the direction of drive, for bevel cutting and the like. The torch-holder can also be reversed by withdrawing its stem from said collar and reinserting it with the collar in front of the swivel, as seen in Fig. 2; and the torch can thus be turned outward horizontally, or at an inclination to the horizontal, for cutting off upstanding flanges and the like. Other capabilities and advantages of the mechanism will be apparent to those skilled in the art.

The angular adjustment of the torch in a fore and aft plane by means of the handle 32 and worm gearing is made use of during the progress of the cut. Thus, it is best to start the cut with the torch substantially vertical, and to tilt it forward gradually and delicately in the direction of travel, as the cut proceeds. The maximum amount of such inclination is usually slight, the showing of Fig. 2 being exaggerated in this respect for convenience of illustration.

What I claim as new is:

1. A torch-adjuster arm of the character described, comprising a primary bracket, a horizontally extending arm member, vertical and horizontal slide means and adjusting devices whereby said arm member is adjustable up and down and in and out relatively to the primary bracket, a torch-holder, and a swivel on the outer end of the arm member carrying the torch-holder and enabling the torch to be tilted forward and rearward in a plane transverse to the arm member.

2. A torch-adjuster arm of the character described, comprising a primary bracket, a horizontally extending arm member, vertical and horizontal slide means and adjusting devices whereby said arm member is adjustable up and down and in and out relatively to the primary bracket, a torch-holder bracket swiveled on the outer end of said arm member, and a torch-holder swiveled upon the torch-holder bracket upon an axis generally at right angles to the axis of swiveling of the torch-holder bracket, whereby the torch is tiltable fore and aft and laterally.

3. A torch-adjuster arm of the character described, comprising a primary bracket, a horizontally extending arm member, vertical and horizontal slide means and adjusting devices whereby said arm member is adjustable up and down and in and out relatively to the primary bracket, an offset torch-holder bracket swiveled on a longitudinal axis on the end of said arm member, and a torch-holder swiveled in said offset bracket on a transverse axis.

4. The combination with a self-propelled wheeled car having a support for a torch arm, of an outwardly extending arm member, a vertical slide on said support carrying said arm member and gearing coöperating with said slide for raising and lowering said arm member on the support, and torch-carrying means angularly adjustable on the arm member.

5. A torch-adjuster arm of the character described, comprising a support, a horizontal guide thereon, a horizontally extending arm member supported by and slidable longitudinally on said horizontal guide, a torch-holder, and a swivel on the outer end of the arm member enabling the torch-holder to be tilted forward and rearward in a plane transverse to the arm member.

6. A torch-adjuster arm of the character described, comprising a support, a horizontal guide thereon, a horizontally extending arm member supported by and slidable longitudinally on said horizontal guide, a torch-holder bracket swiveled on the end of said arm member, and a torch-holder swiveled at right angles on said torch-holder bracket.

7. The combination with a self-propelled wheeled car, of a primary bracket thereon, a horizontally extending arm member, angularly adjustable torch-carrying means on the outer end of said arm member, and horizontal and vertical slide means whereby said arm member is adjustable up and down and in and out relatively to the primary bracket.

8. A torch-adjuster arm of the character described, comprising a primary bracket having a vertical guide thereon, a vertical slide movable on said vertical guide and having a horizontal guide, an elongated horizontal slide movable on said horizontal guide, gearings and handles for shifting said vertical and horizontal slides, and angularly adjustable torch-carrying means on the outer end of said horizontal slide.

9. A torch-adjuster arm of the character described, comprising a support, an outwardly extending arm member, an angular torch-holder bracket swiveled upon a longitudinal axis on the end of said arm member, and a torch-holder swiveled at right angles upon the offset portion of said angular torch-holder bracket.

10. A torch-adjuster arm of the character described, comprising, in combination, an outwardly extending arm member having a cylindrical bearing at its end, an angular torch-holder bracket having collars at its two ends with their axes at right angles to each other, one of said collars rotatably engaging said bearing, and a torch-holder comprising a torch-sleeve and a stem at right angles to the sleeve rotatably held in the other collar of the angular bracket.

11. A torch-adjuster arm for gas-cutting machines comprising a primary bracket, a horizontally extending arm member, angularly adjustable torch-carrying means on the outer end of said arm member, horizontal and vertical slide means whereby said arm member is adjustable up and down and longitudinally of itself with relation to the primary bracket, screw means for effecting the vertical adjustment, and rack-and-pinion means for effecting the horizontal adjustment, both said means having vertical operating shafts with adjacent handles at the top.

12. A torch-adjuster arm for gas-cutting machines comprising a primary bracket, a horizontally extending arm member, horizontal and vertical slide means with operating devices whereby said arm member is adjustable up and down and longitudinally with relation to the primary bracket, a torch-holder bracket swiveled on the end of the arm member, and a torch-holder comprising a torch sleeve and a stem transverse to said sleeve held rotatably in said torch-holder bracket at right angles to the axis of swiveling of said bracket.

13. A torch-adjuster arm for gas-cutting machines comprising a primary bracket, a vertical slide adjustable on said bracket, a horizontal elongated slide adjustable on the vertical slide, vertical screw means on the primary bracket engaging the vertical slide for raising and lowering said slide, a rack on the horizontal slide, the vertical slide having a portion projecting inwardly with respect to the primary bracket, a vertical shaft on such inward projection having a pinion engaging said rack, adjacent operating handles on the upper ends of said screw means and vertical shaft, and torch-carrying means angularly adjustable on the outer end of said horizontal slide.

14. A torch-adjuster arm of the character described, comprising an outwardly-extending arm member, a swiveled torch-holder bracket thereon, and a torch-holder comprising a sleeve and a lateral round stem swiveled in said bracket at right angles to the swiveling of the bracket on the arm.

15. A portable gas-cutting apparatus, comprising, in combination with a self-propelled wheeled car, an outwardly-extending arm member on said car, angularly adjustable torch-carrying means on the outer part of said arm, and slide and gearing means for adjusting the arm on the car.

16. A portable gas-cutting apparatus, comprising, in combination with a self-propelled wheeled car, an outwardly extending arm member on said car, slide and gearing means for adjusting the arm on the car, and means on the outer part of the arm adapted to support a torch to cut either downward or substantially horizontally.

17. A portable gas-cutting apparatus, comprising, in combination with a self-propelled wheeled car, an outwardly extending arm member on said car, slide and gearing means for adjusting the arm on the car, a torch-holder bracket swiveled on the outer end of said arm and having an offset collar at right angles to the axis of its swiveling on the arm, and a torch-holder having a stem rotatable and reversible in said offset collar.

WORTHY C. BUCKNAM.